R. WICKS & J. FAULKNER, Jr.
Mash Apparatus.
No. 8,946. Patented May 11, 1852.
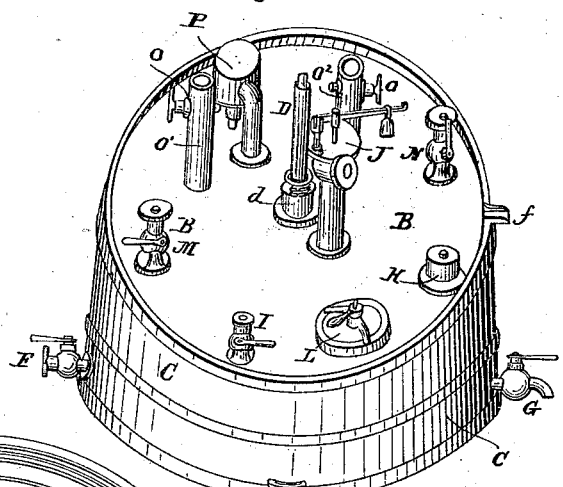
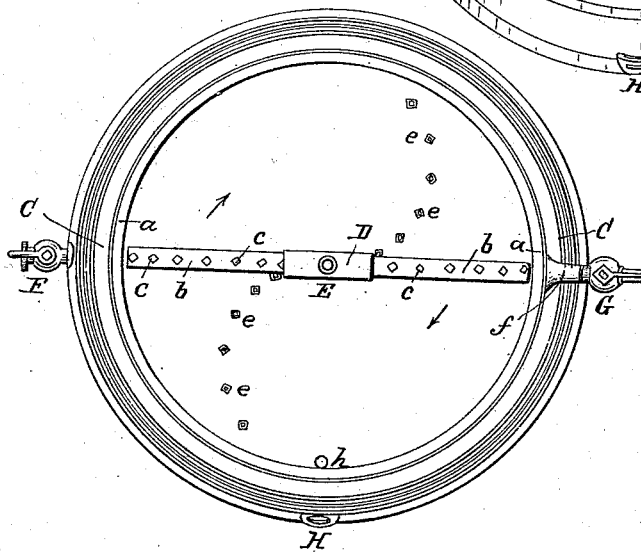
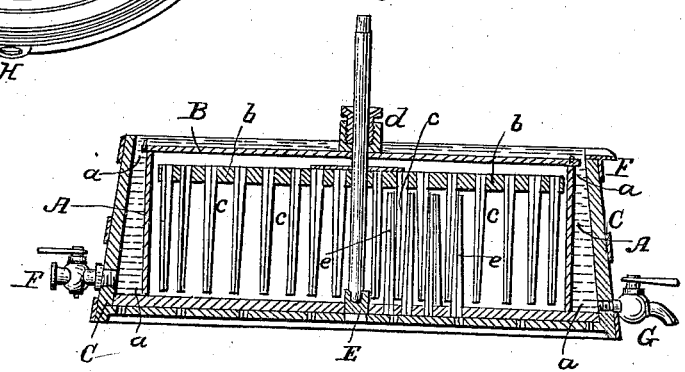

UNITED STATES PATENT OFFICE.

ROBT. WICKS AND J. FAULKNER, JR., OF WILLIAMSBURGH, NEW YORK.

MASH-TUN.

Specification of Letters Patent No. 8,946, dated May 11, 1852.

*To all whom it may concern:*

Be it known that we, ROBERT WICKS and JAMES FAULKNER, Jr., of the city of Williamsburgh, in the county of Kings and State of New York, have invented a new and useful Mash-Tun or Keeve for Mashing Grain Previous to Distillation and a new and useful Method for Cooling the Contents of the Mash-Tun, of which the following is a full, clear, and exact description, reference being had to the accompanying drawings, forming a part of this specification, in which—

Figure 1 is a perspective view of our mash tun, which is a close vessel of iron or other good conducting material, surrounded by an outer case in which it rests on studs, leaving a space for the water to flow all around, over and under the tun. Fig. 2, is a plan of the interior of the mash tun, with its top lid and appurtenances removed. Fig. 3, is a transverse section, in which the lid or cover is seen, but not its outer appendages—the blue color representing the inclosing film or envelop of water, used in our method of cooling the contents of the mash tun.

The same letters of reference denote the same parts in each of the several figures.

The nature of our invention for cooling the contents of the mash tun consists in supplying the top, bottom and sides of the tun with sufficient water, until the inclosed mash is reduced to the proper temperature.

This brief description, with the drawings, is sufficient to enable any one skilled in the art to make use of our invention.

The following important advantages are secured by our method of cooling, in connection with the use of our close mash tun: A more perfect and rapid condensation is effected; the meal or grain is more thoroughly prepared, and produces a stronger beer or mash, and of course yield a larger amount of spirit from the same quantity of material; the mash is not liable to injury by remaining too long at a high temperature, as sometimes happens when cooling by simple evaporation in the open tun; about one-third the time usually employed in the mashing process is saved; the dense vapor arising from the open tun during mashing is avoided, with all its unwholesome and exhausting effects upon the workmen, as well as the danger of falling on a floor kept wet and slippery by splashings over and the abundant vapor, which is so great during a part of the time as to prevent the seeing of objects only a few feet distant—with other advantages that need not be enumerated.

What we claim as our invention, and desire to secure by Letters Patent, is—

The completely enveloping the mash tun with water, or sufficiently so to produce the desired rapidity in cooling the mash.

ROBERT WICKS.
JAMES FAULKNER, Jr.

Witnesses:
WM. RIPLEY,
JOHN WINDS.